United States Patent
Hoepken et al.

(10) Patent No.: US 9,020,823 B2
(45) Date of Patent: Apr. 28, 2015

(54) APPARATUS, SYSTEM AND METHOD FOR VOICE DIALOGUE ACTIVATION AND/OR CONDUCT

(75) Inventors: Harro Hoepken, Solms (DE);
Karl-Heinz Knobl, Allendorf (DE);
David Kämpf, Marburg/Lahn (DE);
Hans-Wilhelm Ruehl, Solms (DE)

(73) Assignee: Continental Automotive GmbH, Hannover (DE)

( * ) Notice: Subject to any disclaimer, the term of this patent is extended or adjusted under 35 U.S.C. 154(b) by 396 days.

(21) Appl. No.: 12/915,879

(22) Filed: Oct. 29, 2010

(65) Prior Publication Data
US 2011/0145000 A1 Jun. 16, 2011

(30) Foreign Application Priority Data
Oct. 30, 2009 (DE) .................... 10 2009 051 508

(51) Int. Cl.
| | | |
|---|---|---|
| G10L 21/00 | (2013.01) | |
| *G10L 15/22* | (2006.01) | |
| *G10L 17/26* | (2013.01) | |
| *G10L 17/00* | (2013.01) | |
| G10L 15/06 | (2013.01) | |
| G10L 15/20 | (2006.01) | |
| G10L 21/0208 | (2013.01) | |
| G10L 21/0216 | (2013.01) | |

(52) U.S. Cl.
CPC ............... *G10L 15/22* (2013.01); *G10L 15/06* (2013.01); *G10L 15/20* (2013.01); *G10L 17/26* (2013.01); *G10L 21/0208* (2013.01); *G10L 2021/02166* (2013.01); *G10L 17/00* (2013.01)

(58) Field of Classification Search
CPC ..... G10L 21/0208; G10L 13/02; G10L 17/00; G10L 15/20; G06F 21/32
USPC .......................................................... 704/275
See application file for complete search history.

(56) References Cited

U.S. PATENT DOCUMENTS

| | | | |
|---|---|---|---|
| 5,165,095 A | | 11/1992 | Borcherding |
| 5,214,707 A | | 5/1993 | Fujimoto et al. |
| 5,522,012 A | * | 5/1996 | Mammone et al. ........... 704/250 |
| 6,073,101 A | | 6/2000 | Maes |
| 6,236,968 B1 | * | 5/2001 | Kanevsky et al. ............ 704/275 |
| 6,498,970 B2 | * | 12/2002 | Colmenarez et al. ........... 701/36 |
| 6,591,237 B2 | | 7/2003 | Erell |
| 6,957,337 B1 | * | 10/2005 | Chainer et al. ................ 713/186 |
| 7,031,477 B1 | * | 4/2006 | Mella et al. ...................... 381/86 |
| 7,359,504 B1 | * | 4/2008 | Reuss et al. ............. 379/406.02 |
| 7,415,410 B2 | | 8/2008 | Campbell et al. |
| 7,478,041 B2 | * | 1/2009 | Ichikawa et al. .............. 704/233 |
| 7,478,043 B1 | * | 1/2009 | Preuss .......................... 704/233 |

(Continued)

FOREIGN PATENT DOCUMENTS

| | | |
|---|---|---|
| DE | 691 01 527 T2 | 7/1994 |
| DE | 691 29 883 T2 | 2/1999 |

(Continued)

*Primary Examiner* — Jakieda Jackson
(74) *Attorney, Agent, or Firm* — Cozen O'Conner

(57) ABSTRACT

An apparatus, a system and a method for voice dialogue activation and/or conduct. The apparatus for voice dialogue activation and/or conduct has a voice recognition unit, a speaker recognition unit and a decision-maker unit. The decision-maker unit is designed to activate a result action on the basis of results from the voice and speaker recognition units.

35 Claims, 4 Drawing Sheets

(56) References Cited

U.S. PATENT DOCUMENTS

| | | |
|---|---|---|
| 7,516,072 B2 * | 4/2009 | Campbell et al. ............ 704/270 |
| 7,693,720 B2 * | 4/2010 | Kennewick et al. .......... 704/275 |
| 8,194,900 B2 * | 6/2012 | Fischer et al. ................ 381/313 |
| 2002/0091527 A1 * | 7/2002 | Shiau ......................... 704/270.1 |
| 2003/0033143 A1 * | 2/2003 | Aronowitz ................... 704/233 |
| 2004/0128131 A1 | 7/2004 | Campbell et al. |
| 2005/0013419 A1 * | 1/2005 | Pelaez et al. ................ 379/88.14 |
| 2005/0049862 A1 | 3/2005 | Choi et al. |
| 2005/0116829 A1 * | 6/2005 | Koenig et al. ................ 340/576 |
| 2005/0216271 A1 * | 9/2005 | Konig ........................... 704/275 |
| 2007/0013498 A1 * | 1/2007 | Knoll et al. ................... 340/438 |
| 2007/0038442 A1 * | 2/2007 | Visser et al. .................. 704/233 |
| 2007/0038444 A1 * | 2/2007 | Buck et al. .................... 704/235 |
| 2007/0061142 A1 * | 3/2007 | Hernandez-Abrego et al. ........................... 704/247 |
| 2007/0244702 A1 * | 10/2007 | Kahn et al. .................... 704/260 |
| 2008/0082338 A1 | 4/2008 | O'Neil et al. |
| 2008/0107283 A1 * | 5/2008 | Fried .............................. 381/77 |
| 2008/0270131 A1 * | 10/2008 | Fukuda et al. ................ 704/246 |
| 2009/0043573 A1 * | 2/2009 | Weinberg et al. ............ 704/223 |
| 2009/0055178 A1 | 2/2009 | Coon |
| 2009/0192705 A1 * | 7/2009 | Golding et al. ............... 701/201 |
| 2009/0192795 A1 * | 7/2009 | Cech ............................. 704/233 |
| 2009/0216935 A1 * | 8/2009 | Flick ............................. 711/103 |
| 2011/0083075 A1 * | 4/2011 | MacNeille et al. ........... 715/728 |
| 2012/0065971 A1 * | 3/2012 | Schrager ....................... 704/235 |
| 2012/0215545 A1 * | 8/2012 | Kurganov et al. ............ 704/275 |

FOREIGN PATENT DOCUMENTS

| | | |
|---|---|---|
| DE | 199 48 366 A1 | 12/2000 |
| DE | 199 62 218 A1 | 7/2001 |
| DE | 101 11 121 A1 | 9/2002 |
| DE | 10 2004 030 054 A1 | 1/2006 |
| EP | 1 513 136 A1 | 3/2005 |
| EP | 1 610 302 A1 | 12/2005 |
| EP | 2 028 061 A2 | 2/2009 |
| WO | WO 00/39789 A1 | 7/2000 |
| WO | WO 00/79515 A2 | 12/2000 |
| WO | WO 2004/061818 A2 | 7/2004 |
| WO | WO 2008/042121 A2 | 4/2008 |

* cited by examiner

APPARATUS, SYSTEM AND METHOD FOR VOICE DIALOGUE ACTIVATION AND/OR CONDUCT

BACKGROUND OF THE INVENTION

1. Field of the Invention

The invention relates to an apparatus, a system and a method for voice dialogue activation and/or voice dialogue conduct.

2. Description of the Related Art

Voice dialogue systems are used to control electronic appliances, such as vehicle computers, without the need for a haptic operator control operation. Based on the prior art, it is known that apparatuses for voice dialogue conduct or for voice dialogue activation search for command words in a voice signal, which has been cleaned up by noise rejection or echo cancellation. In the case of an apparatus voice dialogue activation, a search is for a particular keyword, which is used for activating the voice dialogue. In the case of apparatuses for voice dialogue conduct, the voice signal is then examined to determine whether it contains words that are stored as command words in a command database integrated in the voice dialogue system. If a command word is recognized, an action associated with the command is performed.

Particularly in the conditions of use in which noise affects the system, such apparatuses for voice dialogue conduct or voice dialogue activation are unreliable. This is disadvantageous particularly in the case of use in private vehicles, since apparatuses based on the prior art often unwelcome perform functions in the case of interfering influences, such as calls by passengers, on account of incorrectly recognized commands.

SUMMARY OF THE INVENTION

An object of one embodiment of the invention involves allowing particularly noise-insensitive voice dialogue conduct and/or voice dialogue activation.

As a result of the apparatus comprising not only a voice recognition unit for establishing whether a command word is contained in the voice signal and a decision-maker unit for producing an output signal on the basis of a command word recognized in the voice signal, but also a speaker recognition unit for recognizing a speaker using the voice signal and at least one stored speaker profile, the decision-maker unit is designed such that performance of a result action dependent on the command word is dependent on whether a speaker who has at least partially produced the voice signal has been recognized by the speaker recognition unit as a speaker corresponding to the stored speaker profile, the reliability of command evaluation is significantly increased.

A voice recognition unit can be understood to mean a unit, which is designed to identify command words and/or command word structures from a voice signal. That is to say that a voice model and stored command words are used to assess whether/which command words and command word structures are contained in a voice signal. If a command word is contained then it is recognized as the relevant valid command word.

In this connection, a command word is not necessarily understood to mean only a single word. On the contrary, it means any forms of voice inputs. By way of example, the term "command word" also means numeral/number sequences, phrases, and/or whole sentences.

A speaker recognition unit can be understood to mean a unit which may be designed particularly for extracting speaker features from the voice signal and for comparing the speaker features with speaker-dependent features previously stored in at least one speaker profile, wherein the comparison is used to establish the presence or absence of a match between the current speaker and a speaker associated with the speaker profile. Advantageously, the speaker recognition unit is designed such that a match is established only if the voice signal comes completely from a speaker associated with the speaker profile, i.e. if a plurality of persons are speaking simultaneously then the signal is advantageously attributed to no speaker.

The result action to be performed may be a wide variety of types of result actions.

In apparatuses for voice dialogue activation, the result action may be output as a binary event that contains information only the decision regarding whether or not a voice dialogue is to be activated. Alternatively, the event may contain information about the speaker who is prompting the activation, so that a speaker-dependent activation signal is produced.

In the case of apparatuses for voice dialogue conduct, particularly voice outputs are significant as event actions. These can be used to notify the speaker of information, for example further selection options. If the speaker wishes to retrieve information about nearby restaurants, for example, and uses a command word, which is relevant thereto, the voice dialogue system could ask the speaker to select from a set of possible restaurant types.

Further possible event actions are control events, which control functions of the vehicle. By way of example, a control system for a seat heater could be sent an event for increasing a heating temperature. Furthermore, control signals for retrieving information from further systems located in the vehicle can be output. In addition, it is possible for the event action to be made up of control events and voice output. Further possible output signals are known to a person skilled in the art from apparatuses for voice dialogue conduct based on the prior art.

In addition, one embodiment of the invention relates to a method in which first a voice signal is picked up. Subsequently a command word present in the voice signal or a command structure present is recognized. A speaker is recognized using the voice signal and at least one speaker profile. The recognition of a command word and of a speaker is followed by the performance of a result action on the basis of a result of the recognition of the speaker and the command word.

Advantageously, the decision-maker unit is designed such that a result action, which is dependent on the command word, is performed only when the voice signal containing a command word is identified by the speaker recognition unit as coming from an authorized speaker. That is to say that the results of the speaker recognition unit and of the voice recognition unit are compared with data stored in a user profile, and authorization of the speaker is checked.

In one embodiment, feedback about a lack of authorization can be given. Such feedback has the advantage that the speaker can distinguish between nonrecognition or recognition as an insufficiently authorized speaker.

It is fundamental that input of a command word by an unauthorized speaker preferably does not initiate the result action to be performed which is associated with the command word, i.e. a command word from an unauthorized speaker does not lead to a result action or leads to a different result action than a command word from an authorized speaker.

In one embodiment, it is possible for particular commands to be performed independently of the speaker. By way of example, this allows vehicle functions to be controlled that do not adversely affect the driver. An example in the case of an apparatus for voice dialogue conduct may in this case be a heater for a passenger seat and/or rear seat that can also be set by persons other than the authorized speaker. Advantageously, no voice dialogue is conducted when such commands are input, however the voice dialogue system reacts to commands from unrecognized speakers for the control of uncritical vehicle functions as pure voice control without voice output. Even in the case of an apparatus for voice dialogue activation, it is possible to set up command words, which are independent of the speaker. Thus, by way of example, activation is possible such that an activation signal produced by the command evaluation unit can be used to infer that passenger access with a reduced scope of functions is desired. In the case of such passenger access, activation is effected as pure voice control, for example, which outputs no kind of audio feedback and which is designed merely for executing control commands for uncritical vehicle functions.

In one embodiment, the apparatus is in the form of a combined apparatus for voice dialogue activation and conduct. That is to say that in the unactivated state, the apparatus is used for voice dialogue activation. When the apparatus has been activated by a keyword by an authorized speaker, it operates as an apparatus for voice dialogue conduct.

Particularly in the case of such an embodiment as a combined system, it is possible to define a plurality of different keywords. A first keyword allows the apparatus to be activated by the authorized speaker such that it executes exclusively subsequent further commands from the authorized speaker. In addition, a second keyword can be configured, which puts the apparatus into a state in which it executes commands from any speaker. Advantageously, however, commands from the authorized speaker have higher priority, i.e. a command from the authorized speaker cannot be interrupted by a subsequent command from another person, but can itself interrupt the execution of a command from another person.

In one embodiment, the voice recognition unit has a word recognition unit and a downstream structure recognition unit. The word recognition unit is designed to recognize words from the voice signal such that voice features are extracted from the voice signal and are compared with stored voice features. The structure recognition unit checks word sequences recognized by the word recognition unit to determine whether they contain a structure, which contains a command.

Advantageously, the apparatus has an echo cancellation unit connected upstream of the speaker recognition unit and/or the command word recognition unit. Said echo cancellation unit has at least one input for a mono, stereo and/or multichannel loudspeaker signal. This allows compensation for an influence by a loudspeaker signal on the voice signal by calculating or estimating a signal element produced by the loudspeaker signal and subtracting it from the voice signal.

In addition, the echo cancellation unit may contain a subunit for compensating for voice components produced by further persons. Said subunit advantageously has at least one additional microphone input. The subunit may be designed to compensate for the influence of voice components from further persons, which are picked up by further microphones connected to the additional microphone input. That is to say that the subunit is designed to use an output signal from the further microphones to approximate or calculate an influence by the voice components from the further speakers on the voice signal and to compensate for this influence by deducting it from the voice signal. As an alternative or in addition to the use of further microphones for compensating for voice components from further speakers, the subunit may for this purpose also be designed to filter the voice signal in sync with tuning fundamentals.

As an alternative or in addition, if the input for the voice signal is designed for multichannel voice signals or if there are a plurality of microphone inputs present, the subunit may be designed to use a previously ascertained, estimated, or prescribed location of the speaker to chronologically correlate the various voice signal channels. That is to say that if a plurality of microphones are used, all voice signal components from the voice signal that do not come from the expected location of the speaker are reduced.

The echo cancellation unit is designed to transmit the correspondingly cleaned-up voice signal to the speaker recognition unit and/or voice recognition unit.

Advantageously, the apparatus also contains a noise rejection unit which may be arranged downstream of an echo cancellation, in particular. The noise rejection unit is designed to reject noise components that are static and advantageously also quasi-static, i.e. vary slowly over time.

Advantageously, the noise rejection unit is designed for the parameterized adjustment of a noise response characteristic of the voice signal by frequency response adaptation, particularly such that the noise attributes of the voice signal are matched to the noise attributes of a voice model integrated in the voice recognition unit.

Such adjustment of the noise attributes ensures that the noise rejection does not bring about incompatibilities between the voice signal processed by the noise rejection and the voice models of the voice recognition unit.

Advantageously, the speaker recognition unit and/or the voice recognition unit are designed for the synchronization of an output from recognized speakers to the decision-maker unit with an output of recognized commands by the voice recognition unit. The synchronization ensures that activation of a result action is reliably dependent on whether a speaker and a command word have been recognized in an identical section of the voice signal.

Advantageously, the speaker recognition unit has a further unit integrated in it designed for speaker adaptation, i.e. for continually ascertaining refined speaker-dependent features and for storing said refined speaker-dependent features in the speaker profile associated with the current speaker. This further unit advantageously allows time-related alterations to be stored as attributes in the speaker profile.

With particular advantage, the voice recognition unit also contains an additional unit for speaker adaptation. This allows a significant increase in reliability for the recognition of command words by virtue of the voice recognition unit being matched to a current speaker.

Advantageously, the speaker recognition unit and the voice recognition unit have a driver state sensor unit arranged in parallel with them for sensing the state of the driver using the voice signal, said driver state sensing unit being designed to use the voice signal to sense the state of the driver and to output it to the decision-maker unit, wherein the sensing of the driver state advantageously outputs at least information about fitness to drive (for example tiredness, drugs and/or stress) or the emotional state (for example excited, annoyed, concentrated, relaxed and/or calm).

Advantageously, the apparatus has at least one memory apparatus for storing a user profile and/or the at least one speaker profile. Said memory apparatus may be in the form of a central memory unit, wherein the speaker recognition unit, voice recognition unit and decision-maker unit are connected to the central memory unit. Alternatively, the apparatus has a plurality of memory apparatuses, with at least one in each case being integrated in the speaker recognition unit, voice recognition unit and/or decision-maker unit.

The at least one memory apparatus advantageously has at least one interface for importing or exporting data, so that speakers and/or user profiles can be transferred. This is advantageous particularly when the vehicle is changed, for example on account of a new car purchase, since this allows completely new setup of speaker and user profiles to be avoided.

In one particularly advantageous embodiment, the apparatus is designed such that an incoming voice signal is taken into account even if a result action is performed by the decision-maker unit and that a command contained in the voice signal at least partially interrupts the performance of a result action, which has been initiated by a previous command. Partial interruption may involve a voice output being interrupted while a control event initiated by the previous command continues to be performed. It is thus not necessary for a speaker to wait for a voice output completely. This allows significant speeding up of a voice dialogue, particularly if a speaker who is already familiar with the apparatus already knows selection options communicated by a voice output. In addition, it is advantageous for enumeration of possible selection options to be able to be interrupted after the option desired by the user has been read out.

In addition, a system for voice dialogue activation and/or voice dialogue conduct with at least one loudspeaker, at least one microphone and an apparatus according to the invention for voice dialogue activation or conduct is advantageous. The at least one microphone advantageously has automatic gain adjustment.

The system may be designed for the output of mono, stereo or multichannel audio signals by the at least one loudspeaker and for the pickup of mono, stereo or multichannel voice signals by the at least one microphone. Furthermore, it may contain a microphone array instead of or in addition to individual microphones.

If there are a plurality of microphones present, these are or can be advantageously arranged such that the areas of maximum sensitivity of the microphones overlap in a presumed or ascertained area of an authorized speaker in line with the directional characteristics of said microphones, and a downstream unit for processing the microphone signals by summing the signals after a time delay and other signal processing measures separates the signals from the authorized speakers, lifts the signal from each authorized speaker in its voice channel and reduces all other speaker signals and noise signals (what is known as "beamforming").

Advantageously, the system contains a tracking apparatus for automatically orienting the microphones to an authorized speaker. The tracking apparatus may be designed such that it evaluates a transit time delay in the signals picked up by the microphones in order to ascertain a position for the authorized speaker and then to orient the microphones to said position. Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained below with reference to FIGS. 1 to 4, in which.

DETAILED DESCRIPTION OF THE PRESENTLY PREFERRED EMBODIMENTS

Figure 1:
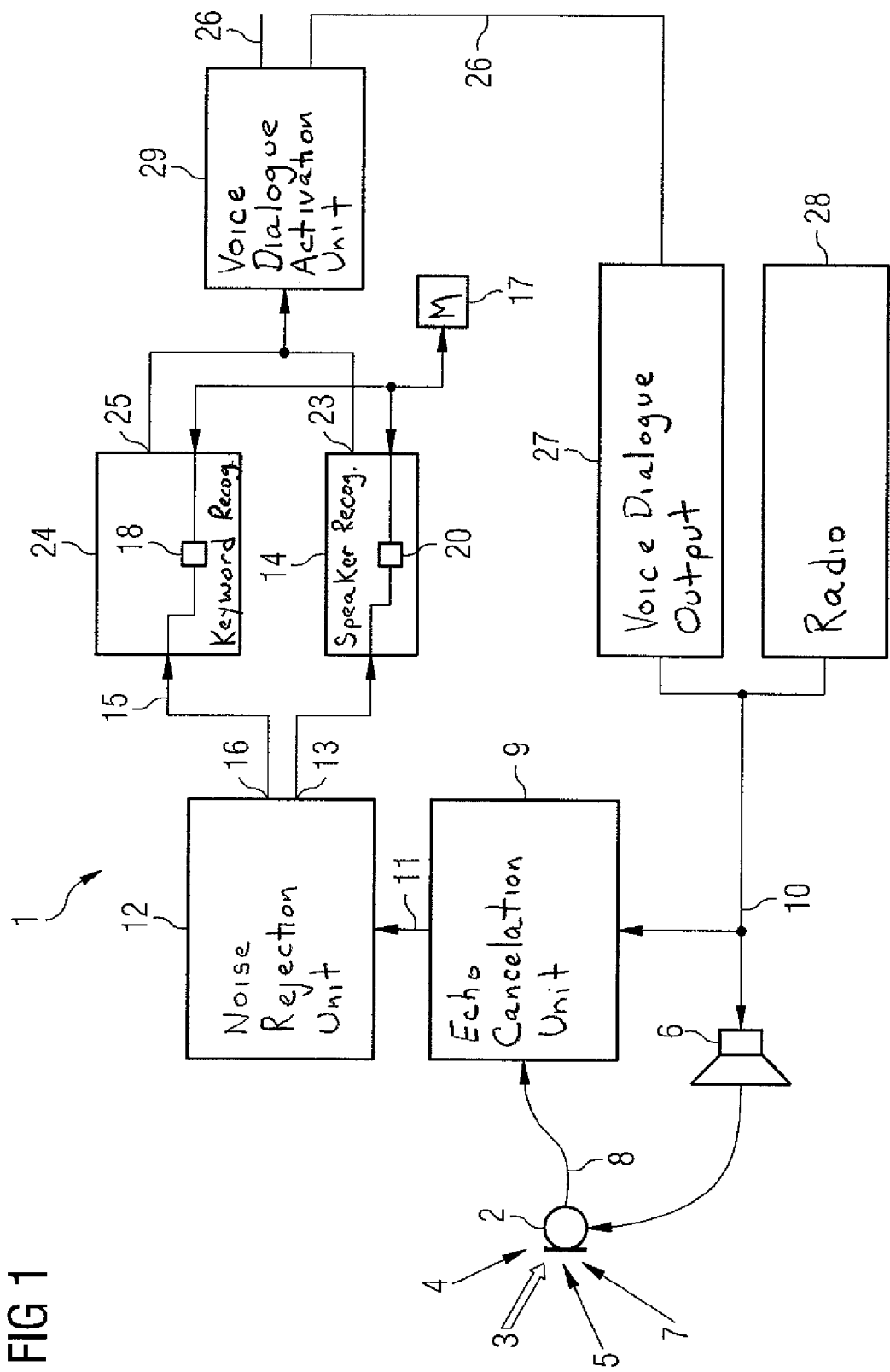
FIG. 1 is a first embodiment of a system according to the invention for voice dialogue activation.

FIG. 1 is a system for voice dialogue activation 1. Said system evaluates a voice signal 8 picked up by the microphone 2. The voice signal comprises an audible voice input 3 made by a user and a plurality of noise signals, namely voice components from other persons in the motor vehicle interior 4, noise from the motor vehicle surroundings 5, music from a radio 28 and/or voice output signals from a voice dialogue output 27 by loudspeaker 6 and sound reflections 7 from the voice input and from the noise signals. The voice signal 8 is input into an echo cancellation unit 9. The echo cancellation unit 9 has an additional input for the loudspeaker signal 10. The echo cancellation unit uses the loudspeaker signal 10 to calculate the influence of the noise signal 6 on the voice signal 8. In addition, the echo cancellation unit calculates the components of the sound reflections 7 caused by the noise signal and the influence thereof on the noise signal 8. The known influences are compensated for by the echo cancellation unit, and the echo-cancelled voice signal 11 is output from the echo cancellation unit 9.

The echo-cancelled voice signal 11 is passed to the input side of a noise rejection unit 12 and subjected to noise cancellation. This deducts a static subfloor from the signal 11. In addition, quasi-static, i.e. slowly varying noise components, are compensated for. Furthermore, the noise response characteristic of the signal 11 is parametrically adjusted by frequency response adaptation. This matches the noise attributes of the signal 11 to the noise attributes of a voice model of the keyword recognition unit 24.

The noise-cancelled signal 15 is output by a first output 13 and a second output 16.

The first output 13 is connected to the speaker recognition unit 14. The speaker recognition unit 14 is designed to extract speaker features from the signal 15. These extracted speaker features are compared by the speaker recognition unit 14 in succession with features stored in speaker profiles in a memory apparatus 17, such that a respective speaker profile is called in succession and the features stored therein are compared with the extracted features. This is repeated until the extracted features have been aligned with all the stored speaker profiles. It is thus established whether the extracted features match the features from one of the speaker profiles.

If such a match is found, the speaker recognition unit transmits the information about the recognized speaker to the voice dialogue activation unit 29 via the output 23.

In addition, the speaker recognition unit 14 has an integrated further unit 20 for speaker adaptation, which is designed for continually refining the speaker-dependent features. The refined speaker-dependent features are stored by the further unit in the speaker profile which is associated with the speaker and which is stored on the memory apparatus 17.

The further unit 20 is designed to determine time-related alterations in the speaker content features and to store them as attributes in the speaker profile on the memory apparatus 17.

The speaker recognition unit 14 has a keyword recognition unit 24 arranged in parallel with it. The latter is designed to recognize whether and which valid command words and valid voice command forms are contained in the voice signal. Accordingly ascertained commands are output by the output 25.

Furthermore, the keyword recognition unit contains an additional unit 18 for speaker adaptation. This unit is designed to optimize the keyword recognition for a current authorized speaker. To this end, the additional unit extracts voice features from the voice signal and compares them with individual voice features stored in the speaker profile. The individual voice features are refined and/or complemented on the basis of the comparison result. This allows alterations in the voice features over time to be captured as an attribute and stored in the speaker profile. The individual voice features ascertained/complemented in this manner can be taken into account during the recognition of keywords. Since voice models, which are thus used for keyword recognition, can be matched to the current speaker, it is possible to significantly increase the reliability of the keyword recognition.

The speaker recognition unit 14 and the keyword recognition unit 24 have the voice dialogue activation unit 29 arranged downstream of them. This is designed to output one or more events 26 if the keyword recognition unit 24 has recognized an appropriate command word and at the same time the speaker recognition unit has recognized a speaker who is authorized for activation.

One of the events can activate a voice dialogue output 27 and a further event can activate a voice dialogue output system (not shown).

Figure 2:
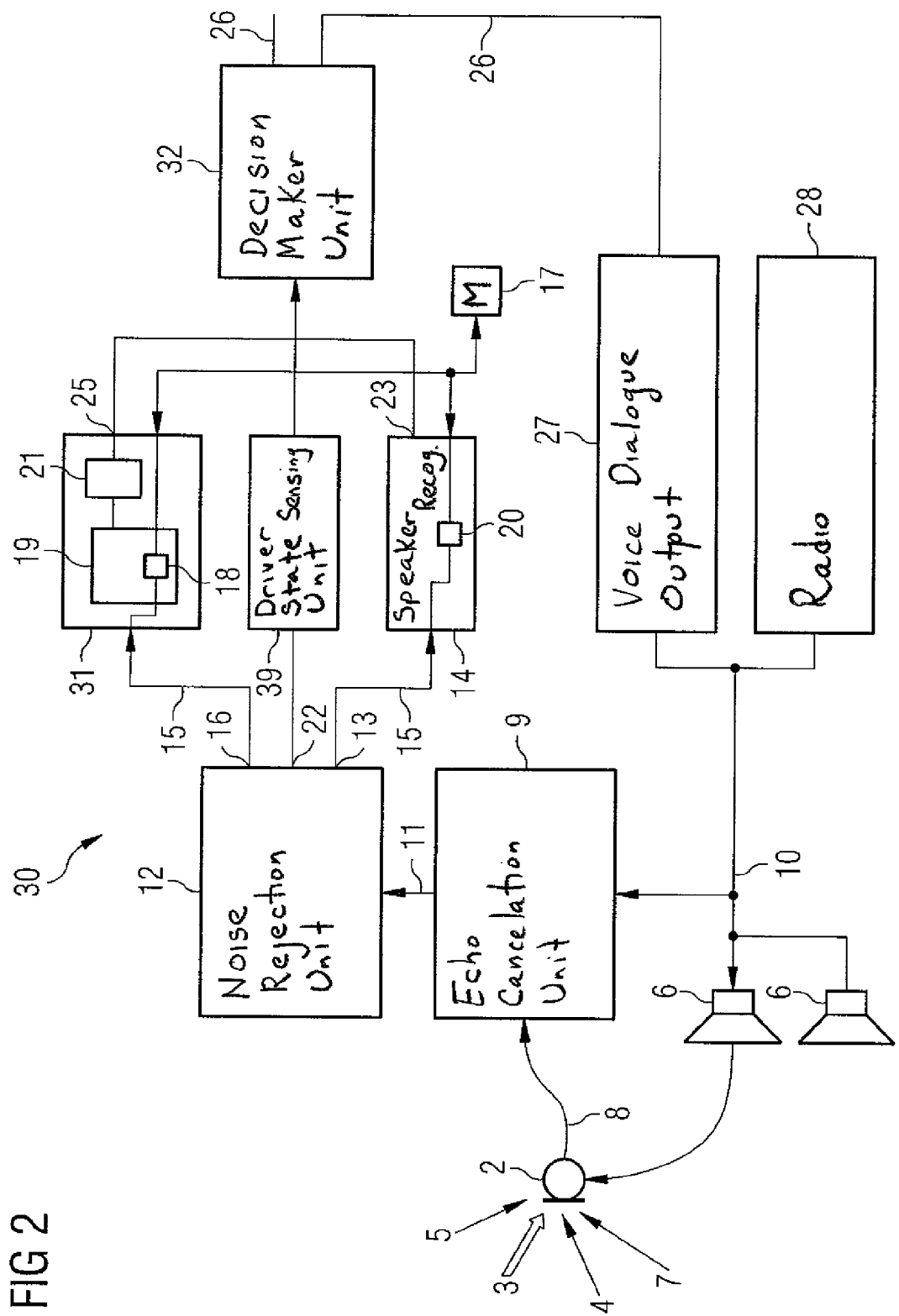
FIG. 2 is a first embodiment of a system according to the invention for voice dialogue conduct.

FIG. 2 shows an exemplary embodiment of a system for voice dialogue conduct 30. Instead of the keyword recognition unit 24, said system has a more complex voice recognition unit 31, and a voice dialogue unit 32 instead of the voice dialogue activation unit 29.

The voice recognition unit 31 differs from the keyword recognition unit 24 from the first exemplary embodiment essentially in that not just some keywords are recognized as valid but a multiplicity of different commands and in that not just words per se but structures formed by the words are recognized. In this regard, the voice recognition unit 31 is divided into a word recognition unit 19 for recognizing words and a structure recognition unit 21 for recognizing structures formed by the words. Such division may also be advantageous in systems for voice dialogue activation. The additional unit 18 for speaker adaptation is integrated in the word recognition unit 19 and performs an identical function therein to that in the first exemplary embodiment.

The voice dialogue unit 32 also has a correspondingly larger scope of functions. Said unit is designed to conduct a voice dialogue with the authorized speaker, wherein the voice dialogue sequence is controlled adaptively by the authorized speaker. Such a voice dialogue sequence can be controlled through the selection of various options in a menu by the user, for example. When a user has selected an option, he can enter a further menu with further selection options, for example. In addition to the conduct of the voice dialogue, the voice dialogue unit 32 is designed to output various control signals for vehicle functions when commanded by the authorized speaker.

Apart from the aforementioned differences from the first exemplary embodiment, the exemplary embodiment shown in FIG. 2 is distinguished in that instead of one loudspeaker 6 a plurality of loudspeakers 6 are arranged. However, as in the first exemplary embodiment, these are merely designed for the output of a mono signal.

A further difference over the previous embodiment is that the noise rejection unit has a third output 22. This output is connected to a driver state recognition unit 39 designed to recognize a state of the driver, such as hoarseness, tiredness, alcohol consumption, drug use or annoyance.

The driver state, which has been recognized, is forwarded to the voice dialogue unit. This is designed to take account of the driver state for the decision about a result action.

An additional difference over the exemplary embodiment from FIG. 1 is that the system is designed for barge-in, i.e. when a command is recognized while a voice output on the basis of a preceding command is still occurring, the latter is interrupted.

Figure 3:
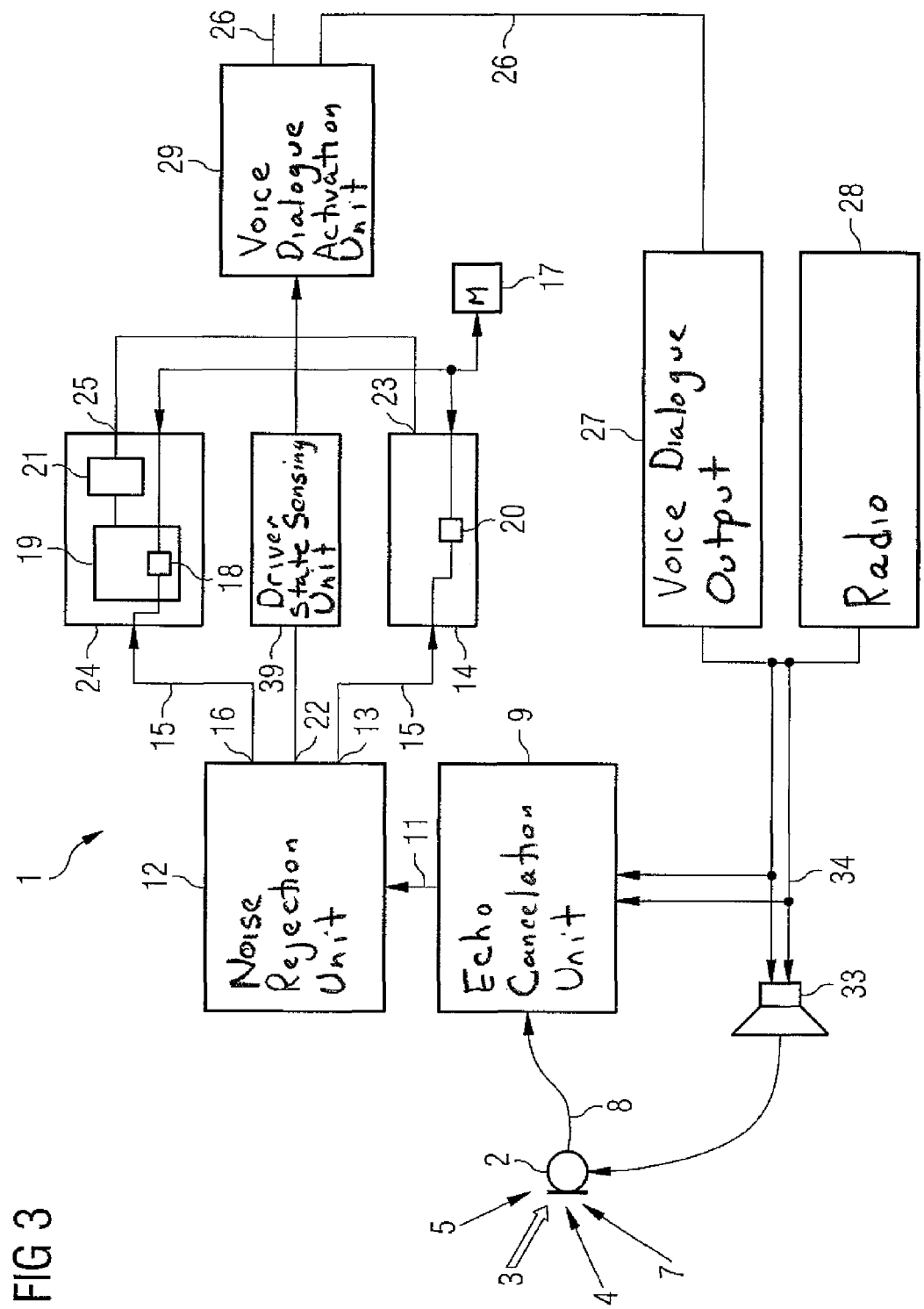
FIG. 3 is a second embodiment of a system according to the invention for voice dialogue activation.

FIG. 3 shows a second exemplary embodiment of a voice dialogue activation system. The latter differs from the example shown in FIG. 1 in that instead of one loudspeaker 6 a loudspeaker combination 33 is present. This combination is designed for the output of mono, stereo, and multichannel signals 34. Accordingly, the echo cancellation unit is designed to compensate for multichannel signals 34. Furthermore, the voice dialogue activation system contains a driver state recognition unit 39 in precisely the same way as the exemplary embodiment shown in FIG. 2.

Figure 4:
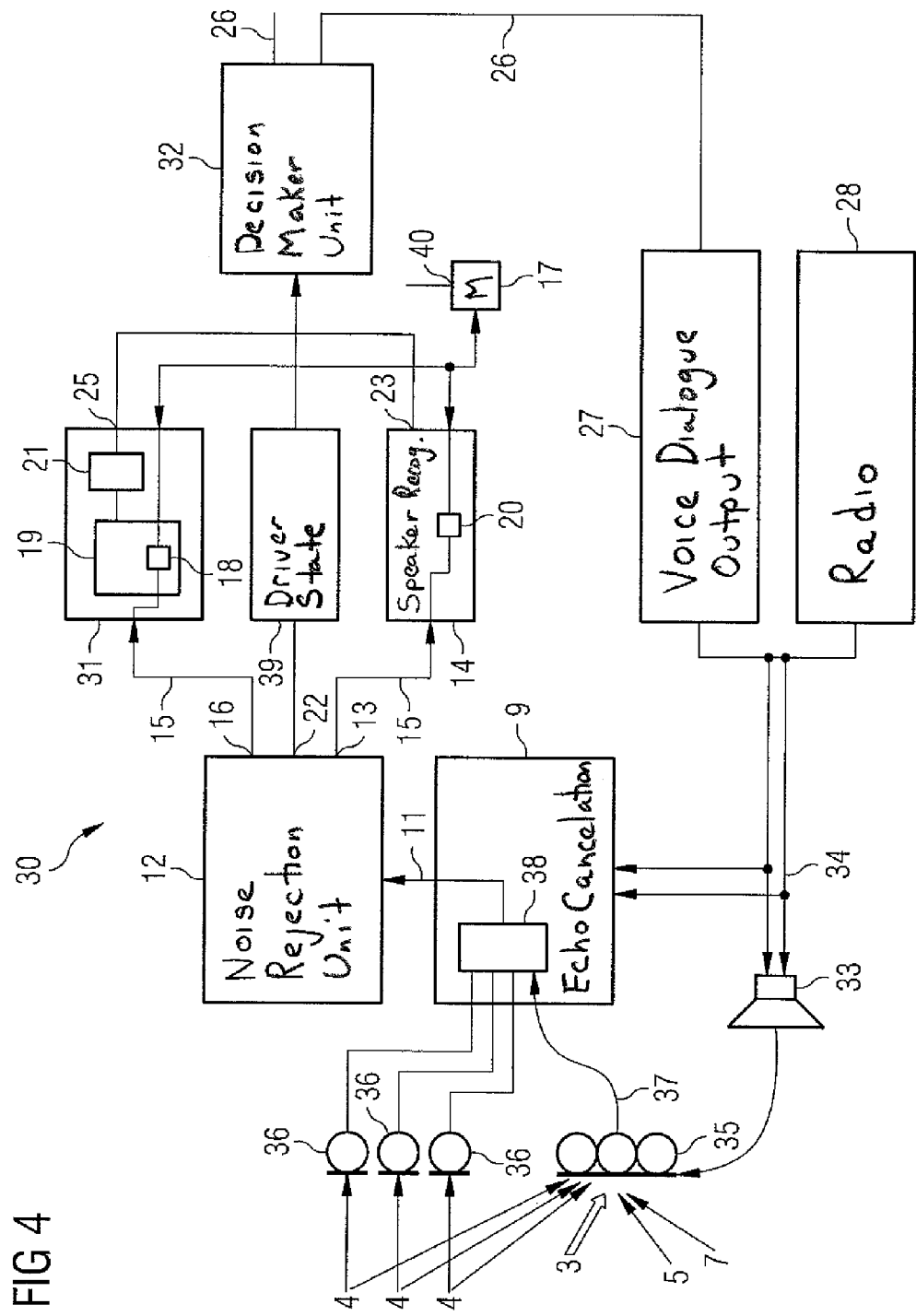
FIG. 4 is a second embodiment of a system according to the invention for voice dialogue conduct.

FIG. 4 shows a second exemplary embodiment of a system for voice dialogue conduct. Said system incorporates a microphone array 35 and a few further microphones 36 instead of a single microphone 2. The microphone array and the further microphones are designed such that they have a directional characteristic, i.e. they preferably receive sound from a particular spatial area. The microphone array 35 picks up a multichannel voice signal 37, which is routed, to the echo cancellation unit instead of the voice signal 8.

In addition, a loudspeaker combination 33 is used for outputting mono, stereo and multichannel signals 34 in this case too.

The microphone array 35 may contain a microphone tracking apparatus 50 that automatically tracks the microphones in the array to the authorized speaker. To this end, the microphone tracking apparatus 50 evaluates a transit time difference for the voice signal to the various microphones in the array and therefore determines the location of the authorized speaker.

Before being input into the echo cancellation unit, the voice signal picked up by the microphone array is post-processed in a unit for processing the microphone signals which is connected downstream of the microphone array by summing the signals after a time delay. This separates the signals from the authorized speakers and reduces all other speaker signals and noise signals.

One of the further microphones 36 is oriented to every further vehicle seat. The echo cancellation unit contains a subunit 38, which is designed to compensate for the influence of the further persons in the vehicle interior on the signal 37 using the signals from the further microphones 36. That is to say that the subunit uses the signals from the further microphones 36 to calculate the presumed influence of the further persons on the signal 37 and deducts these signal components accordingly.

In addition, the echo cancellation unit evaluates the transit time difference for the various channels of the multichannel voice signal 37 and removes all components of the signal 37 which, on the basis of their transit time difference, do not come from the location of the authorized speaker.

In addition, the exemplary embodiment shown in FIG. 4 is distinguished in that the memory apparatus 17 is connected to an output 40 for the purpose of linking a USB port, card reader or optical drive. This allows user profiles to be imported and/or exported.

It goes without saying that the choice of loudspeakers and microphones is independent of whether a system for voice dialogue conduct or voice dialogue activation is present, i.e. systems for voice dialogue activation with loudspeaker/microphone arrangements as shown in FIGS. 2 and 4 or systems for voice dialogue conduct with loudspeaker/microphone arrangements as shown in FIGS. 1 and 3 are also advantageous.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An apparatus for at least one of voice dialogue activation and voice dialogue conduct, for use in a vehicle, comprising:
   at least one input for a voice signal;
   a voice recognition unit configured to establish one or more command words contained in the voice signal;
   a speaker recognition unit configured to determine a current speaker using the voice signal and at least one stored speaker profile;
   a decision-maker unit comprising:
      a voice recognition unit connection coupled to an output of the voice recognition unit configured to perform a result action based on the one or more command words, and
      a speaker recognition unit connection coupled to the speaker recognition unit,
      the decision-maker unit being configured such that the activation of the result action is dependent, at least in the case of at least one command word, on whether the at least one command word has been identified as coming from a speaker associated with a speaker profile; and
   an echo cancellation unit that receives a multichannel voice signal and, on the basis of transit time differences among components of the multichannel signal with respect to the at least one input, removes all components from non-authorized speakers,
   wherein:
   the speaker recognition unit is configured to identify the current speaker by extracting speaker features from the voice signal and comparing the speaker features with stored speaker-dependent features, and comprises a further unit configured for speaker adaptation to continually ascertain refined speaker-dependent features and store the refined speaker-dependent features in the stored speaker profiles, and
   the speaker recognition unit is configured to, in the case that a plurality of speakers are speaking simultaneously, attribute the voice signal to no speaker.

2. The apparatus as claimed in claim 1, wherein the decision-maker unit is configured to align and correlate results from the speaker recognition unit and from the voice recognition unit with speaker-specific information stored in a speaker profile, wherein performance of at least one command-word-dependent result action is suppressed if a current speaker is not authorized to perform the result actions.

3. The apparatus as claimed in claim 1, wherein the apparatus is configured as a combined apparatus for voice dialogue conduct and activation.

4. The apparatus as claimed in claim 1, wherein the voice evaluation unit comprises a word recognition unit configured to recognize words and also a downstream structure evaluation unit configured to recognize command-forming structures.

5. The apparatus as claimed in claim 1, wherein the echo cancellation unit is connected directly or indirectly upstream of at least one of the speaker recognition unit and the voice recognition unit, wherein the echo cancellation unit has one or more inputs for loudspeaker signals that comprise at least one of mono, stereo, and multichannel loudspeaker signals, the echo cancellation unit configured to compensate for the influence of the loudspeaker signals on the voice signal.

6. The apparatus as claimed in claim 5, wherein the echo cancellation unit comprises a subunit configured to compensate for voice components from other persons, said subunit connected to at least one input for the connection of additional microphones.

7. The apparatus as claimed in claim 1, wherein at least one of the speaker recognition unit and the voice recognition unit has a noise rejection unit connected directly or indirectly upstream.

8. The apparatus as claimed in claim 1, wherein at least one of the speaker recognition unit and the voice recognition unit is configured to synchronize an output from a speaker recognized by the speaker recognition unit to the decision-maker unit with an output of command words recognized by the voice recognition unit.

9. The apparatus as claimed in claim 1, wherein a driver state sensing unit for sensing a state of the driver using the voice signal is arranged in parallel with the speaker recognition unit and the voice recognition unit.

10. The apparatus as claimed in claim 1, wherein the voice recognition unit comprises an additional unit configured to capture time-related alterations in the speaker features of a speaker as an attribute and to store them in a stored speaker profile associated with the speaker.

11. The apparatus as claimed in claim 1, further comprising at least one memory apparatus configured to store at least one of user profiles and speaker profiles.

12. The apparatus as claimed in claim 11, wherein the at least one memory apparatus has at least one interface configured to input or output the stored at least one of the user profiles and speaker profiles such that the stored at least one of the user profiles and speaker profiles may be transferred to/from another vehicle.

13. The apparatus as claimed in claim 1, wherein the apparatus is activated to evaluate the voice signals even during the performance of a result action, such that recognition of a command from an authorized speaker prompts at least partial interruption of the performance of a result action triggered by a prior command.

14. The apparatus as claimed in claim 1, wherein the decision-maker unit is configured such that some command words are performed independently of the recognition of a speaker associated with the speaker profile.

15. The apparatus as claimed in claim 1, further comprising at least one memory apparatus configured to store speaker profiles, wherein the at least one memory apparatus has at least one interface configured to input or output the stored speaker profiles such that the stored speaker profiles may be transferred to/from another vehicle.

16. A system for voice dialogue activation and/or voice dialogue conduct comprising:
    at least one input for a voice signal;
    a voice recognition unit configured to establish one or more command words contained in the voice signal;
    a speaker recognition unit configured to determine a current speaker using the voice signal and at least one stored speaker profile;
    a decision-maker unit comprising:
        a voice recognition unit connection coupled to an output of the voice recognition unit configured to perform a result action based on the one or more command words, and
        a speaker recognition unit connection coupled to the speaker recognition unit,
        the decision-maker unit being configured such that the activation of the result action is dependent, at least in the case of at least one command word, on whether the at least one command word has been identified as coming from a speaker associated with a speaker profile;
    at least one microphone coupled to the voice recognition unit; and at least one loudspeaker coupled to the voice recognition unit; and
    an echo cancellation unit that receives a multichannel voice signal and, on the basis of transit time differences among components of the multichannel signal with respect to the at least one input, removes all components from non-authorized speakers,
    wherein:
    the speaker recognition unit is configured to identify the current speaker by extracting speaker features from the voice signal and comparing the speaker features with stored speaker-dependent features, and comprises a further unit configured for speaker adaptation to continually ascertain refined speaker-dependent features and store the refined speaker-dependent features in the stored speaker profiles, and
    the speaker recognition unit is configured to, in the case that a plurality of speakers are speaking simultaneously, attribute the voice signal to no speaker.

17. The system as claimed in claim 16, further comprising at least one of a plurality of microphones and at least one microphone array arranged such that areas of optimum reception provided by directional characteristics of the microphones, for at least some of the microphones overlap in the presumed area of authorized speakers.

18. The system as claimed in claim 17, wherein the microphones are configured to automatically orient to a position of the speaker sensed by the microphones.

19. A method for voice dialogue activation and/or conduct comprising:
    picking up a voice signal;
    recognizing at least one of a command word and a command word structure from the voice signal;
    recognizing a speaker using the voice signal and at least one stored speaker profile;
    performing a result action based on a recognized command word and a recognized speaker, wherein the voice signal is a multichannel voice signal;
    removing, on the basis of transit time differences among components of the multichannel signal with respect to at least one microphone, all components from non-authorized speakers,
    wherein recognizing an authorized speaker involves speaker features being extracted from the voice signal and being aligned with individual speaker features stored in a speaker profile,
    wherein speaker adaptation is performed which continuously refines and complements the individual speaker features stored in the speaker profile, and
    wherein speaker recognition, in the case that a plurality of speakers are speaking simultaneously, attributes the voice signal to no speaker.

20. The method as claimed in claim 19, wherein the recognizing the at least one of the command word or the command word structure contains further comprises:
    recognizing words contained in the voice signal; and recognizing command structures formed by the words.

21. The method as claimed in claim 19, wherein at least one of the recognition of the command word and the recognition of a speaker is preceded by performance of echo cancellation such that overlays from a loudspeaker signal produced by reflections in a passenger compartment are removed from the voice signal by calculating the overlays produced by the loudspeaker signal and subtracting them from the voice signal.

22. The method as claimed in claim 21, wherein voice signal components of the voice signal by further persons are determined and at least partially removed from the voice signal.

23. The method as claimed in claim 22, wherein the voice signal is a multichannel voice signal.

24. The method as claimed in claim 23, further comprising chronological correlation of differently time-shifted signals from different channels of the multichannel voice signal to extract and separate those components of the voice signal which come from one of the locations of authorized speakers.

25. The method as claimed in claim 19, wherein a dependency of performance of a result action on a recognized command word and a recognized speaker involves performance of a result action being suppressed if the associated speaker one of has not been recognized and is not authorized to instruct the result action.

26. The method as claimed in claim 19, wherein the recognition of one of the command word or of the speaker is preceded by performance of noise rejection.

27. The method as claimed in claim 19, wherein time-related alterations in the speaker features are captured as an attribute and stored in the speaker profile.

28. The method as claimed in claim 27, wherein the recognizing command words comprises extracting voice features from the voice signal aligned with individual voice features stored in the speaker profile.

29. The method as claimed in claim 28, wherein speaker adaptation is performed which continuously refines and complements the individual voice features stored in the speaker profile.

30. The method as claimed in claim 29, wherein time-related alterations in the voice features are captured as an attribute and stored in the speaker profile.

31. The method as claimed in claim 30, wherein the voice signal is used to sense a driver state.

32. The method as claimed in claim 19, wherein subsequent performance of the result action is interrupted by input of a further voice signal, containing a further command word from an authorized speaker.

33. The method as claimed in claim 19, wherein the voice signal is used to ascertain locations of authorized speakers comprising producing a control signal for orienting at least one microphone to locations of the authorized speakers independent of a command word contained in the voice signal.

34. The method as claimed in claim 33, wherein the performance of the result action involves output of a voice dialogue signal.

35. The method as claimed in claim 34, wherein the performance of the result action comprises signal output of a control signal to controls a function of an apparatus integrated in a vehicle.

* * * * *